US005875281A

United States Patent [19]

Thexton et al.

[11] Patent Number: 5,875,281

[45] Date of Patent: Feb. 23, 1999

[54] DC SOLID STATE SERIES WOUND MOTOR DRIVE

[75] Inventors: Graham S. Thexton, Troy; John Aker, Barboursville, both of Va.

[73] Assignee: Cableform, Inc., Troy, Va.

[21] Appl. No.: 898,468

[22] Filed: Jul. 24, 1997

[51] Int. Cl.[6] .......... H02P 7/20

[52] U.S. Cl. .......... 388/801; 318/247; 318/259; 318/376; 318/379

[58] Field of Search .......... 318/244, 245, 318/246, 249, 250, 139, 375, 376, 379, 380, 256, 257, 258, 259, 247; 388/800, 803, 809, 801

[56] References Cited

U.S. PATENT DOCUMENTS

| | | | |
|---|---|---|---|
| 3,289,063 | 11/1966 | Short . | |
| 3,346,771 | 10/1967 | Sutton . | |
| 3,535,605 | 10/1970 | Halvorson et al. . | |
| 3,548,279 | 12/1970 | Knasinski et al. . | |
| 3,551,771 | 12/1970 | Risberg et al. . | |
| 3,553,554 | 1/1971 | Risberg . | |
| 3,555,384 | 1/1971 | Halvorson et al. . | |
| 3,555,385 | 1/1971 | Risberg . | |
| 3,660,738 | 5/1972 | Anderson et al. | 318/138 |
| 3,746,954 | 7/1973 | Myles et al. . | |
| 3,906,328 | 9/1975 | Wenrich et al. | 318/612 |
| 4,385,266 | 5/1983 | Sloan . | |
| 4,422,021 | 12/1983 | Schwarz | 318/376 |
| 4,423,363 | 12/1983 | Clark et al. | 318/375 |
| 4,506,200 | 3/1985 | Dätwyler et al. | 318/493 |
| 4,639,647 | 1/1987 | Posma . | |
| 4,677,356 | 6/1987 | Tsuneda et al. . | |
| 5,274,541 | 12/1993 | Kimura et al. | 363/56 |
| 5,332,954 | 7/1994 | Lankin | 318/139 |

*Primary Examiner*—Bentsu Ro
*Attorney, Agent, or Firm*—Richard C. Litman

[57] ABSTRACT

Direct current (DC) solid state series wound motor drives for hoist and crane applications. A microprocessor controlled electronic system is employed to control the speed, direction, acceleration and deceleration of a direct current DC solid state series wound motor drive for a hoist or a crane (bridge or trolley). The operation can be via an operator, radio remote, or computer communication link. The system requires a speed and direction command from the operator controls; it then configures the motor and varies the speed while offering certain protection circuits. The DC series wound motor drive includes a DC series wound motor comprising an armature and a series wound field that is supplied with DC voltage power from an external source. The DC voltage power supply can either be generated DC or rectified alternating current (AC). High speed insulated gate bipolar transistor (IGBT) switching elements are provided.

6 Claims, 11 Drawing Sheets

| SPEED | IGBT1 | IGBT2 | DB |
|---|---|---|---|
| 1st | 20% | OFF | OPN |
| 2nd | 40% | OFF | OPN |
| 3rd | 60% | OFF | OPN |
| 4th | 80% | OFF | OPN |
| 5th | 100% | OFF | OPN |

DC SOLID STATE SERIES WOUND MOTOR DRIVE

BACKGROUND OF THE INVENTION

1. Field of the Invention

The present invention relates to direct current (DC) solid state series wound motor drives for hoist and crane applications.

2. Description of Related Art

Series wound motors on hoists have been controlled with contactor resistor controls. Such arrangements are a maintenance problem and very energy inefficient. Moreover, they have the problem of not being able to provide high torque at low speed because the speed limiting resistors also limit current into the motor, and they can only provide the same value of current to the motor that is drawn from the supply.

Power distribution collector bars to the cranes are by necessity of heavy construction and the power supply has to be capable of providing very high currents when accelerating heavy loads. These heavy currents are transmitted to the crane by collector brushes, which are a maintenance item. The series motor can be abused by such systems. If the motor is overloaded and all the control resistors are shorted off, then full stall current can be applied to the motor. The hoist has to be protected from being pulled into its own mechanism, thus stalling the motor and full stall torque causing the cable to break and drop the load.

A second existing method of control is by AC/DC conversion (phase control) which can provide a stepless control; but it too has severe torque limits at low speed, must have an AC supply and does not provide significant current amplification.

U.S. Pat. No. 3,289,063, issued on Nov. 29, 1966 to Brooks H. Short, describes a series motor having parallel connected transistors that control the current flow through the field of the series motors such that the field winding is divided into smaller segments which are connected respectively in series with the transistors. Short does not suggest the DC solid state series wound motor drive according to the claimed invention.

U.S. Pat. No. 3,346,771, issued on Oct. 10, 1967 to Robert S. Sutton, describes a digital electronic speed control governor which is designed to hold the speed of an internal combustion engine at 3600 r.p.m. plus or minus 10 r.p.m., between full load and no load conditions, so that the generator connected to the engine output and operating at a frequency of 60 cycles per second at 120 volts would maintain this frequency within one cycle per second and the voltage within 2 volts. Sutton does not suggest the DC solid state series wound motor drive according to the claimed invention.

U.S. Pat. No. 3,535,605, issued on Oct. 20, 1970 to John A. Halvorson et al., describes a static reversing chopper shunt motor hoist control system with a limit stop and a backout control means operable in combination therewith for applying dynamic braking and mechanical braking to stop a load, for reversing the mechanical brake and for providing reduced negative torque to drive the load down in response to lowering operation, and for limiting the backout speed at both no load and full load conditions in the event the limit stop and backout control means do not reset. Halvorson et al. do not suggest the DC solid state series wound motor drive according to the claimed invention.

U.S. Pat. No. 3,548,279, issued on Dec. 15, 1970 to Max S. Knasinski et al., describes a static control system for a shunt motor having an armature winding and a shunt field winding to provide an improved voltage bootstrap circuit for lowering the control voltage on a gating type switching circuit as soon as it is fired into conduction, thereby minimizing the firing circuit power requirements for a plurality thereof connected to the same voltage supply. Knasinski et al. do not suggest the DC solid state series wound motor drive according to the claimed invention.

U.S. Pat. No. 3,551,771, issued on Dec. 29, 1970 to Robert L. Risberg et al., describes a static control system for the shunt motor field of a crane hoist having a static field supply and a solid state reversing chopper supplied from a constant potential bus for armature control with a first semiconductor controlled rectifier (SCR) controlled resistor loop for 75 percent second quadrant retarding torque and a second SCR controlled resistor loop usable with the first one for 150 percent fourth quadrant retarding torque. The Risberg et al. '771 patent does not suggest the DC solid state series wound motor drive according to the claimed invention.

U.S. Pat. No. 3,553,554, issued on Jan. 5, 1971 to Robert L. Risberg, describes a constant potential bus static reversing chopper hoist static shunt motor control system with improved means for providing control retarding torque upon the hoist, which is controllable from zero to a first value limit, and for providing additional retarding torque upon lowering that is controllable from a zero to a larger value. The Risberg '554 patent does not suggest the DC solid state series wound motor drive according to the claimed invention.

U.S. Pat. No. 3,555,384, issued on Jan. 12, 1971 to John A. Halvorson et al., describes a static, constant potential bus, shunt motor control system having a static chopper circuit with means serving the dual function of protecting the switching devices from excessive supply voltage and decaying the commutating energy after it has performed its function. Halvorson et al. do not suggest the DC solid state series wound motor drive according to the claimed invention.

U.S. Pat. No. 3,555,385, issued on Jan. 12, 1971 to Robert L. Risberg, describes a static, constant potential bus, shunt motor control system having smooth regenerative braking control means with static anti-plugging control means. The Risberg '385 patent does not suggest the DC solid state series wound motor drive according to the claimed invention.

U.S. Pat. No. 3,746,954, issued on Jul. 17, 1973 to Asa H. Myles et al., describes a hoist control system for operating a direct current series motor from a single-phase or three-phase alternating current source. Myles et al. do not suggest the DC solid state series wound motor drive according to the claimed invention.

U.S. Pat. No. 4,385,266, issued on May 24, 1983 to Albert E. Sloan, describes a pulse control circuit for a DC series motor which has an armature and two oppositely-wound field windings, that includes two semiconductor static switching devices, such as thyristors. The control means is adapted, when the mark-to-space ratio of one of the static switching devices has been brought to a predetermined maximum value, to cause simultaneous operation of the other static switching device at a lower mark-to-space ratio thereby energizing the associated field winding so as to reduce the net flux in the motor and further increase the motor speed. Sloan does not suggest the DC solid state series wound motor drive according to the claimed invention.

U.S. Pat. No. 4,506,200, issued on Mar. 19, 1985 to Walter Dätwyler et al., describes a control system for operating a shunt wound DC motor by controlling the motor to follow the operating characteristics of a conventional shunt wound motor when this characteristic is optimal and to follow alternatively the operating characteristics of a conventional series wound motor when this second characteristic is optimal. Dätwyler et al. do not suggest the DC solid state series wound motor drive according to the claimed invention.

U.S. Pat. No. 4,639,647, issued on Jan. 27, 1987 to Bonne W. Posma, describes a controller for controlling at least one series motor that includes connecting rectifier means in series with the motor such that the current to the field winding of the motor is always in the same direction irrespective of the plurality of the input voltage. Further, the controller provides for applying an energizing current to the field winding to ensure that the field winding always produces some flux during operation of the motor such that a counter EMF always exists whenever the motor rotates. Posma does not suggest the DC solid state series wound motor drive according to the claimed invention.

U.S. Pat. No. 4,677,356, issued on Jun. 30, 1987 to Haruhiro Tsuneda et al., describes a drive motor device that detects and measures the level of the motor drive current, and when the drive control device detects that the motor drive current exceeds a predetermined target value, a gating circuit in the path of the forward and reverse drive signals is directed to invert the forward and reverse drive signals thereby reversing the direction of the motor direction drive current. This results in a braking action. Tsuneda et al. do not suggest the DC solid state series wound motor drive according to the claimed invention.

U.S. Pat. No. 5,274,541, issued on Dec. 28, 1993 to Shin Kimura et al., describes that in a module using a high speed switching element, such as an insulated gate bipolar transistor (IGBT), for a high speed inverter, a matching condition is established between the switching characteristic of the IGBT and the recovery characteristic of a diode connected thereto in an antiparallel fashion. The oscillating voltage appearing in the inverter circuit, as a result of the IGBT, is suppressed to prevent erroneous operation of the inverter system. Kimura et al. do not suggest the DC solid state series wound motor drive according to the claimed invention.

U.S. Pat. No. 5,332,954, issued on Jul. 26, 1994 to Robert Lankin, describes an electric controller for a motor that has an H-bridge circuit for controlling a field current of the motor. The controller may be configured with a series wound or a separately excited DC traction motor. Lankin does not suggest the DC solid state series wound motor drive according to the claimed invention.

None of the above inventions and patents, taken either singly or in combination, is seen to describe the instant invention as claimed.

SUMMARY OF THE INVENTION

The present invention relates to DC solid state series wound motor drives for hoist and crane applications. A microprocessor controlled electronic system is employed to control the speed, direction, acceleration and deceleration of a DC solid state series wound motor drive for a hoist or a crane (bridge or trolley). The operation can be via an operator, radio remote, or computer communication link. The system requires a speed and direction command from the operator controls; it then configures the motor and varies the speed while offering certain protection circuits. The DC series wound motor drive includes a DC series wound motor comprising an armature and a series wound field that is supplied with DC voltage power from an external source. The DC voltage power supply can either be generated DC or rectified alternating current (AC). High speed insulated gate bipolar transistor (IGBT) switching elements are provided.

Power is delivered to the motor through isolation contactors. A charge-up resistor connected in series with a diode is provided in parallel with a line contactor. A capacitor precharge circuit and an optional overvoltage dump is provided. Directional contactors and a dynamic braking contactor are provided for the motor. The motor also includes an upper limit switch which has two sets of normally open contacts, and two sets of normally closed contacts. Current measuring devices, preferably Hall effect devices, are included.

Accordingly, it is a principal object of the invention to provide DC solid state series wound motor drives for hoist and crane applications that include the use of high speed insulated gate bipolar transistor (IGBT) switching elements.

It is another object of the invention to provide a DC solid state series wound motor drive that produces high torque at low speed.

It is a further object of the invention to provide a motor drive that produces more current in the motor than is drawn from the supply.

Still another object of the invention is to provide a motor drive with a significantly increased operating life span.

It is an object of the invention to provide improved elements and arrangements thereof in DC solid state series wound motor drives for hoist and crane applications which are inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention relates to direct current DC solid state series wound motor drives for hoist and crane applications. The motor drives use of an electronic system to control the speed, direction, acceleration and deceleration of a DC solid state series wound motor drive for a hoist or a crane (bridge or trolley). The operation can be via an operator, radio remote, or computer communication link. The system requires a speed and direction command from the operator controls; it then configures the motor and varies the speed while offering certain protection circuits.

Figure 1:
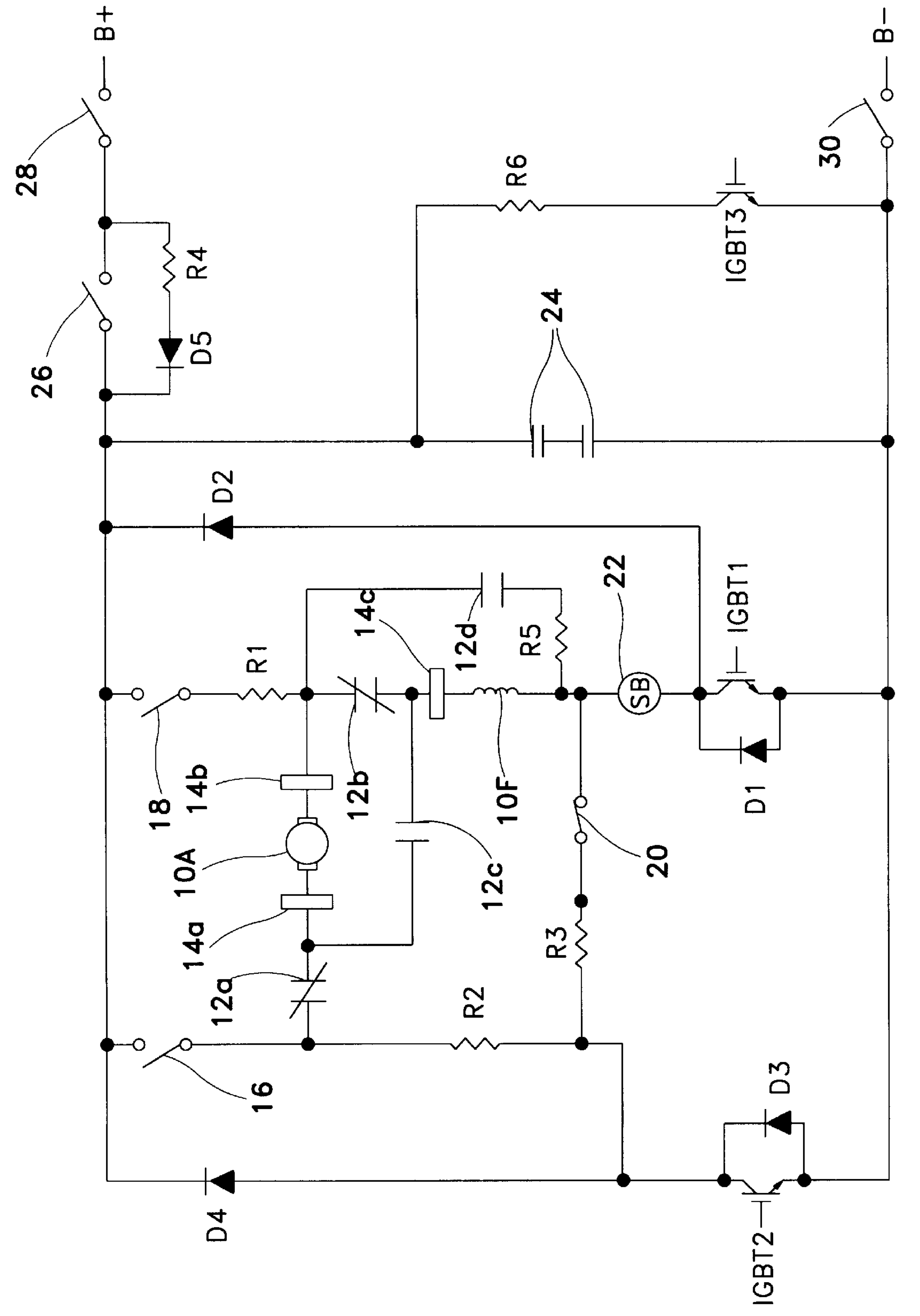
FIG. 1 is an electrical schematic diagram of a hoist motor circuitry in accordance with the invention.

A preferred embodiment of a DC series wound motor drive for a hoist is illustrated in FIG. 1. A DC series wound motor comprising an armature 10A and a series wound field 10F is supplied with DC voltage power from an external source to supply lines B+ and B−. The DC voltage power supply can either be generated DC or rectified alternating current (AC). Power is delivered to the motor through contactors 28, 30, and line contactor 26. A charge up resistor R4 connected in series with a diode D5 is provided in parallel with line contactor 26. Diode D5 provides reverse polarity protection to the system. A capacitor precharge circuit is provided by capacitor bank 24 and resistor R4, and an optional overvoltage dump is provided by dump resistor R6 and insulated gate bipolar transistor switching element IGBT3. A 'RAISE' contactor 16, a 'LOWER' contactor 18, and a dynamic braking (DB) contactor 20 are provided for the motor.

The motor also includes an upper limit switch which has two sets of normally open contacts 12*c* and 12*d,* and two sets of normally closed contacts 12*a* and 12*b*. Current measuring devices 14*a,* 14*b,* and 14*c,* preferably Hall effect devices, are included. Power resistors R1, R2, and R3 are also provided. A conventional series brake (SB) 22 is provided to ensure loads cannot be moved until sufficient current is flowing in the circuit and that the loads can be stopped should current cease to flow. Of prime importance to the invention is the inclusion of high speed switching elements IGBT1 and IGBT2. Each switch IGBT1 and IGBT2 includes respective diodes, D1 and D3, connected in parallel. Diode D1 is built into IGBT1 but is not necessary for the invention. Each switch is additionally connected to respective flywheel diodes D2 and D4.

Figure 2A:
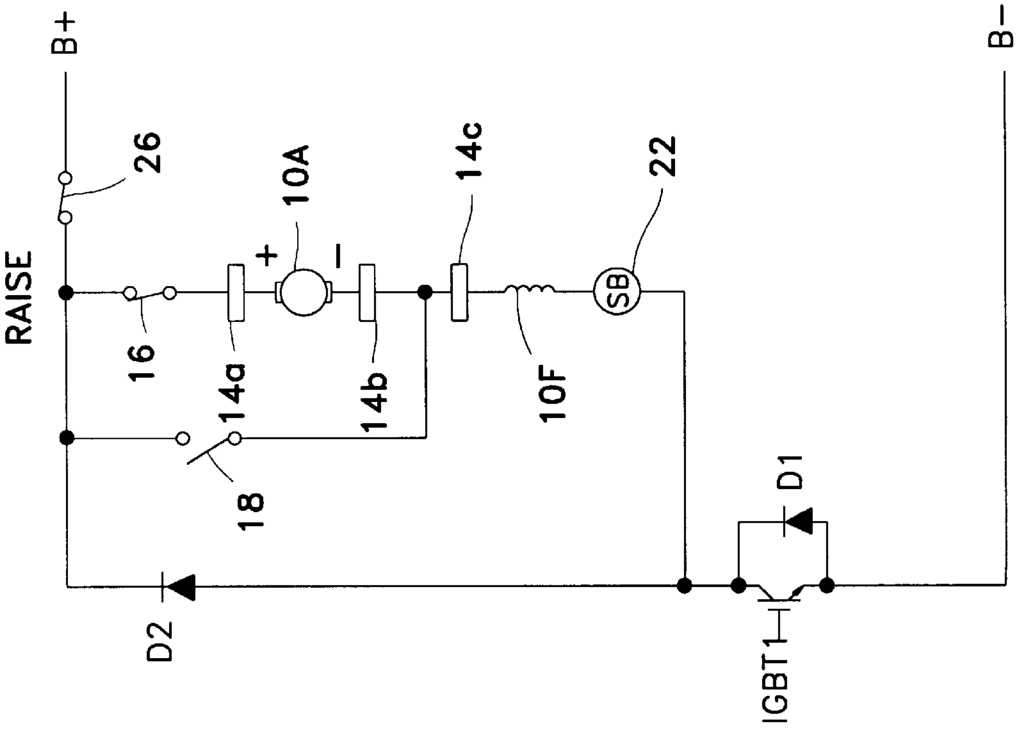
FIG. 2A is an functional electrical schematic diagram of the hoist motor circuitry shown in FIG. 1 in the "RAISE" mode.
Figure 2B:
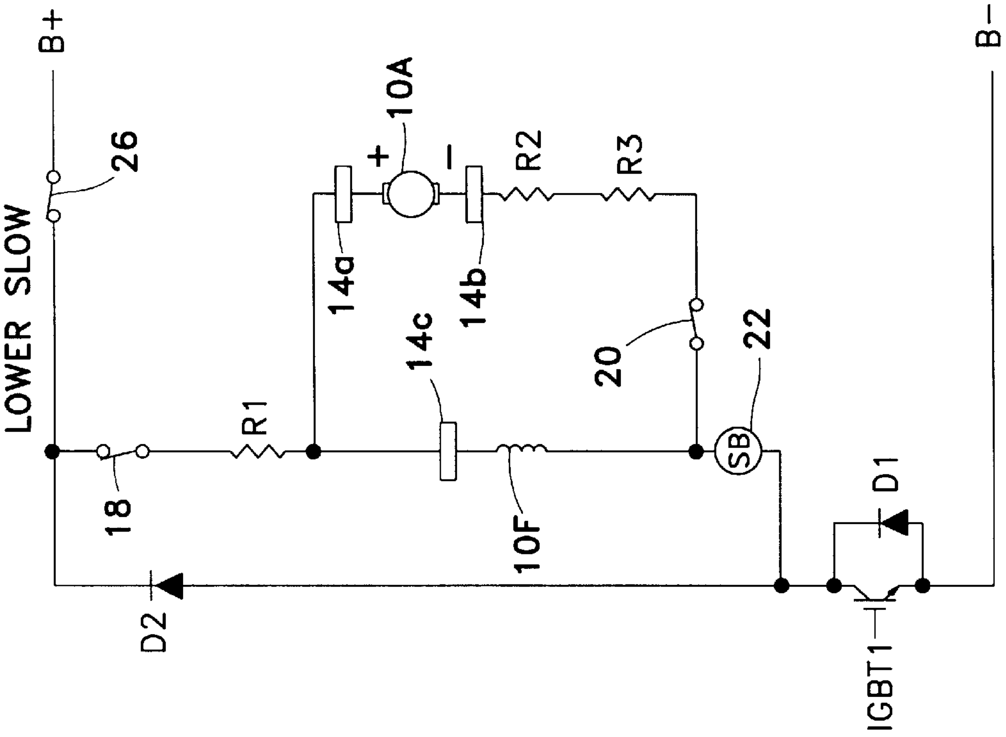
FIG. 2B is a functional electrical schematic diagram of the hoist motor circuitry shown in FIG. 1 in the "LOWER SLOW" mode.
Figure 2D:
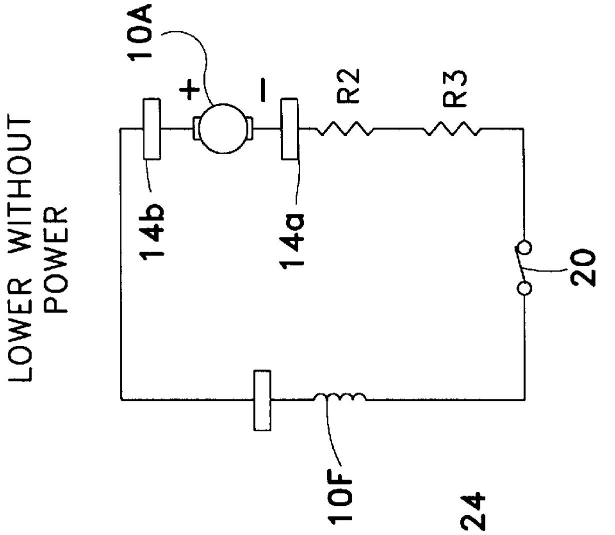
FIG. 2D is a functional electrical schematic diagram of the hoist motor circuitry shown in FIG. 1 in the "LOWER WITHOUT POWER" mode.

FIGS. 3A to 7 are flow charts showing the logic included in a microprocessor (not shown) that controls the hoist motor circuitry shown in FIGS. 1–2D. The programming of the microprocessor may take well-known forms. The microprocessor requires a speed and direction command from the operator controls; it then configures the motor and varies the speed while offering certain protection circuits.

The operation of the hoist DC motor will now be described. Operation is initiated by closing contactors 28 and 30. The capacitor bank 24 then charges at a controlled rate via the charge up resistor R4 across the line contactor 26. The diode D5 in series with resistor R4 provides reverse polarity protection to the system. The microprocessor logic becomes operational, performs system safety checks, and then closes line contactor 26 when the emergency switch is closed and the charge on the capacitor bank 24 has reached an acceptable level. The 'RAISE' contactor 16 and 'LOWER' contactor 18 are open, the DB contactor 20 is closed, and IGBT1 and IGBT2 are both gated off. The field 10F is initially energized at high ampere turns, releasing the series brake 22 and providing maximum torque at low speed. The motor drives the load down.

In the 'RAISE' mode, as shown in FIG. 2A, the motor is configured as a series machine by leaving 'LOWER' contactor 18 open and closing 'RAISE' contactor 16. The DB contactor 20 is opened and then IGBT1 with pulse width modulation control provides variable speed, current limit, over temperature protection, etc. without any contactors switching under load.

In general the operator control will demand 'RAISE' at a certain speed. The rate at which voltage is applied to the motor is programmed, but can be overridden by current limit controls. Within these limits IGBT1 is pulsed at a rate to provide the motor with a voltage which will provide the speed requested. The speed is somewhat load dependent unless a speed measuring device is built into the hoist. As an option the output of the speed measurement can be fed into the microprocessor which can provide closed loop speed control. The series brake 22 will release when the motor current is sufficiently high and the motor will accelerate to the required speed. If the operator then demands a higher speed, the switching pulse width of IGBT1 is increased and the motor will ramp up to the higher speed. If the operator demands a lower speed, the pulse width of IGBT1 is reduced and the motor will ramp down to the lower speed.

In the 'LOWER SLOW' mode, as shown in FIG. 2B, the motor is configured as a separately excited machine by opening 'RAISE' contactor 16, closing 'LOWER' contactor 18, and leaving DB contactor 20 closed. To drive the load down, IGBT2 is gated off. For a fixed value of Ri, the field current and the voltage applied to armature 10A are controlled by pulsing IGBT1. The field 10F is initially energized at high ampere turns, releasing the series brake 22 and providing maximum torque at low speed. The motor drives the load down. If the load is large enough to overhaul, the armature 10A will generate into the field 10F, cause an increased field strength and a balancing torque. To allow a higher speed the field strength can be reduced by the chopper. To slow down the field strength can be increased by the chopper. To stop the chopper is switched off and the series brake 22 is set.

Figure 2C:
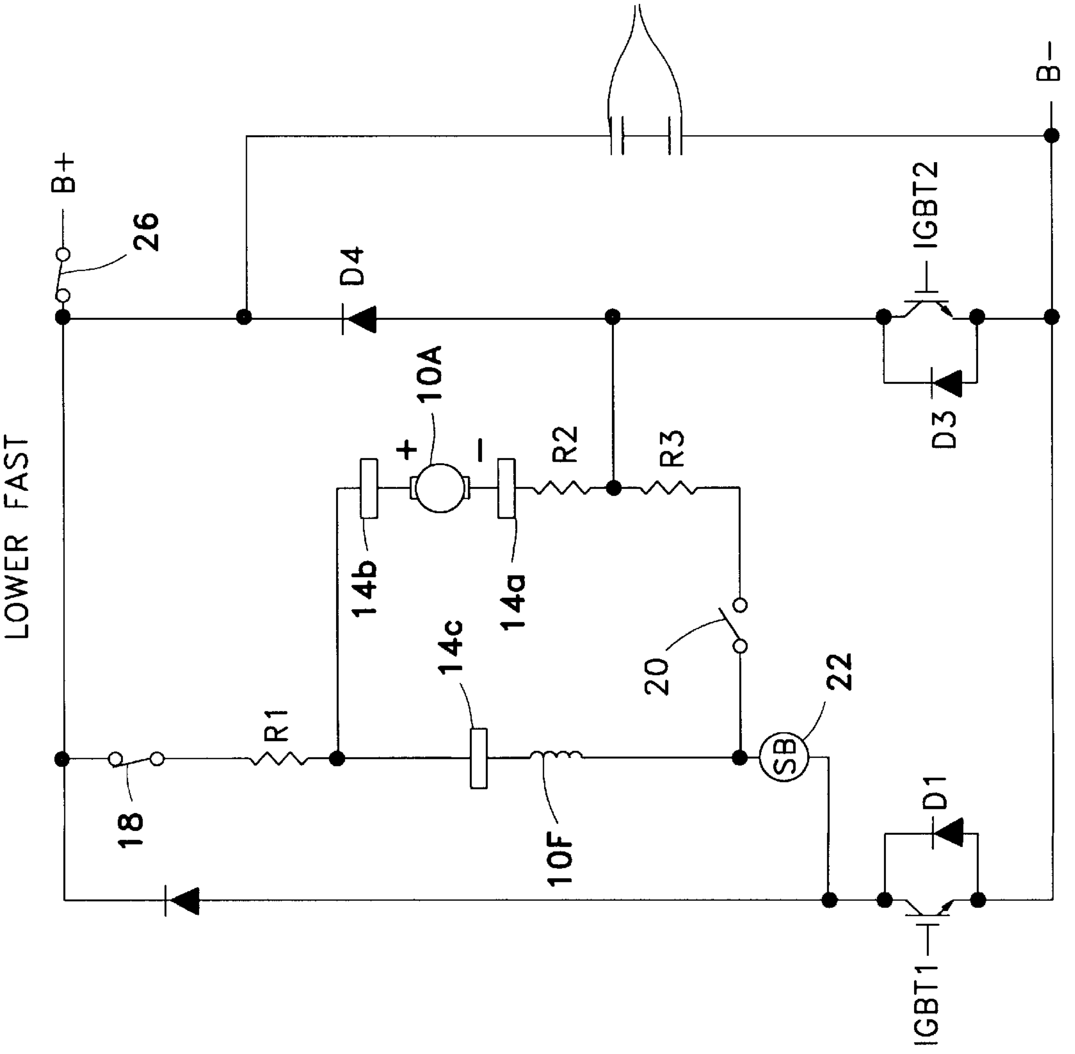
FIG. 2C is a functional electrical schematic diagram of the hoist motor circuitry shown in FIG. 1 in the "LOWER FAST" mode.
Figure 3A:
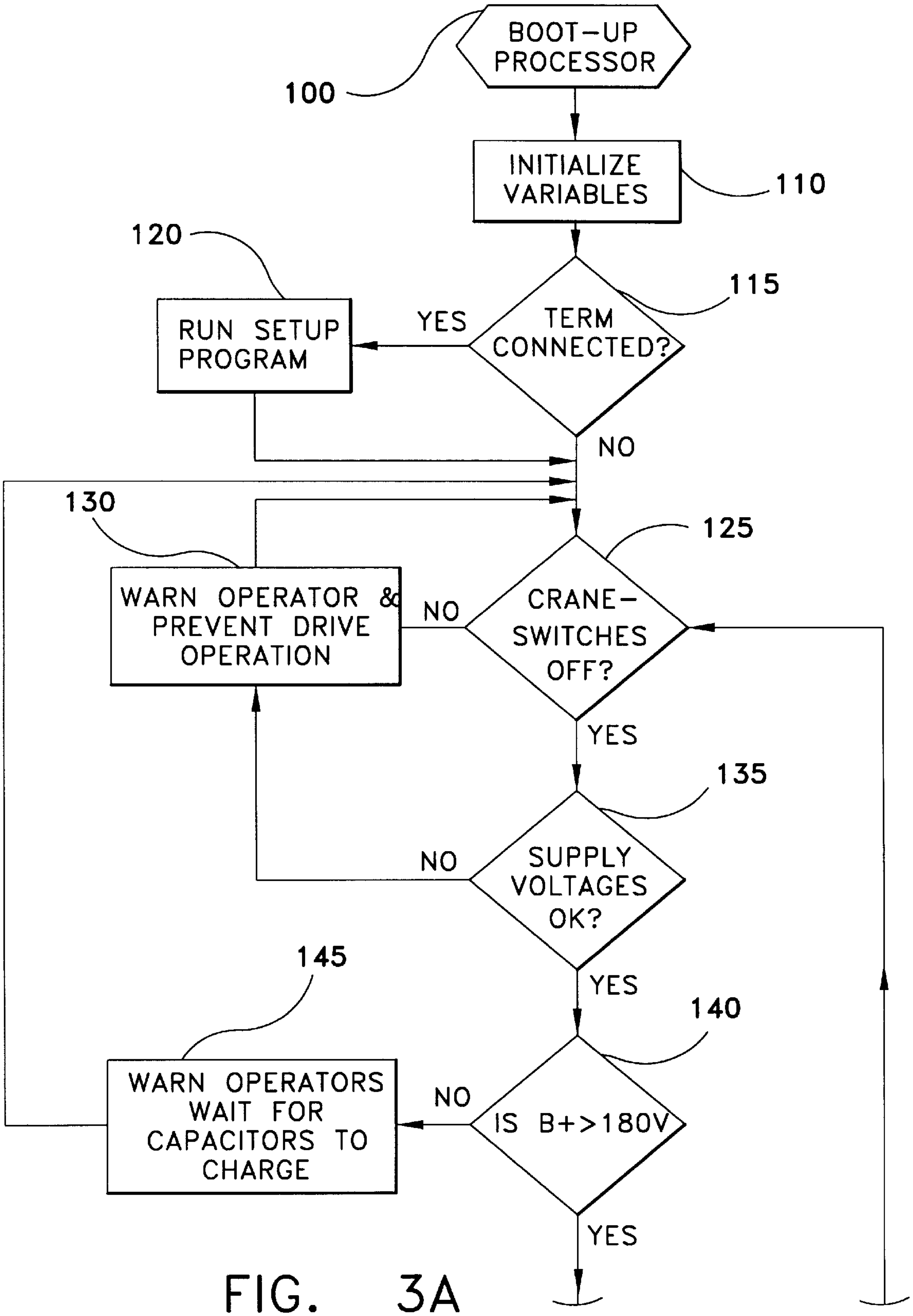
FIGS. 3A–3B are a first flow chart of the hoist control in accordance with the invention.
Figure 3B:
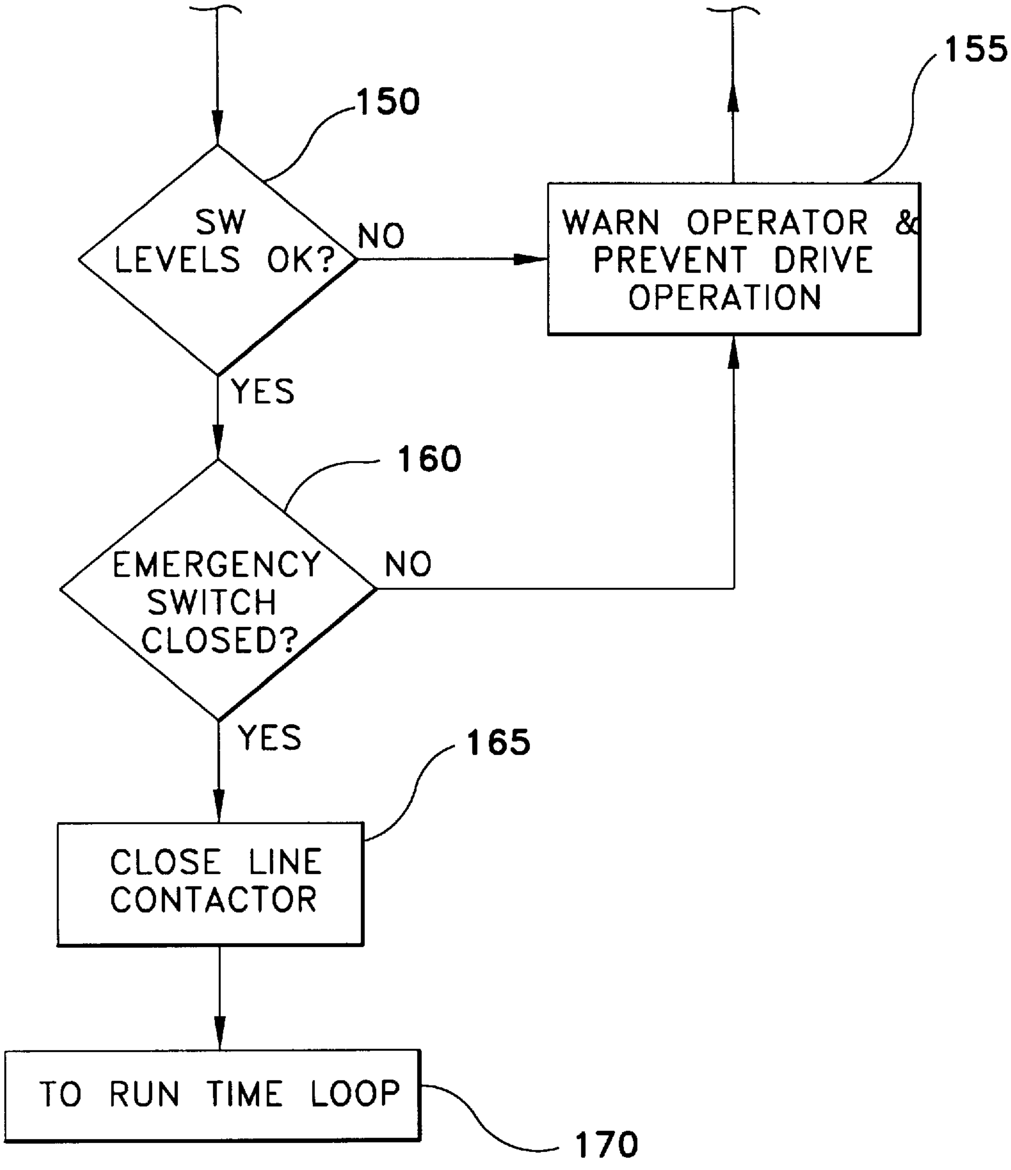
Figure 4A:
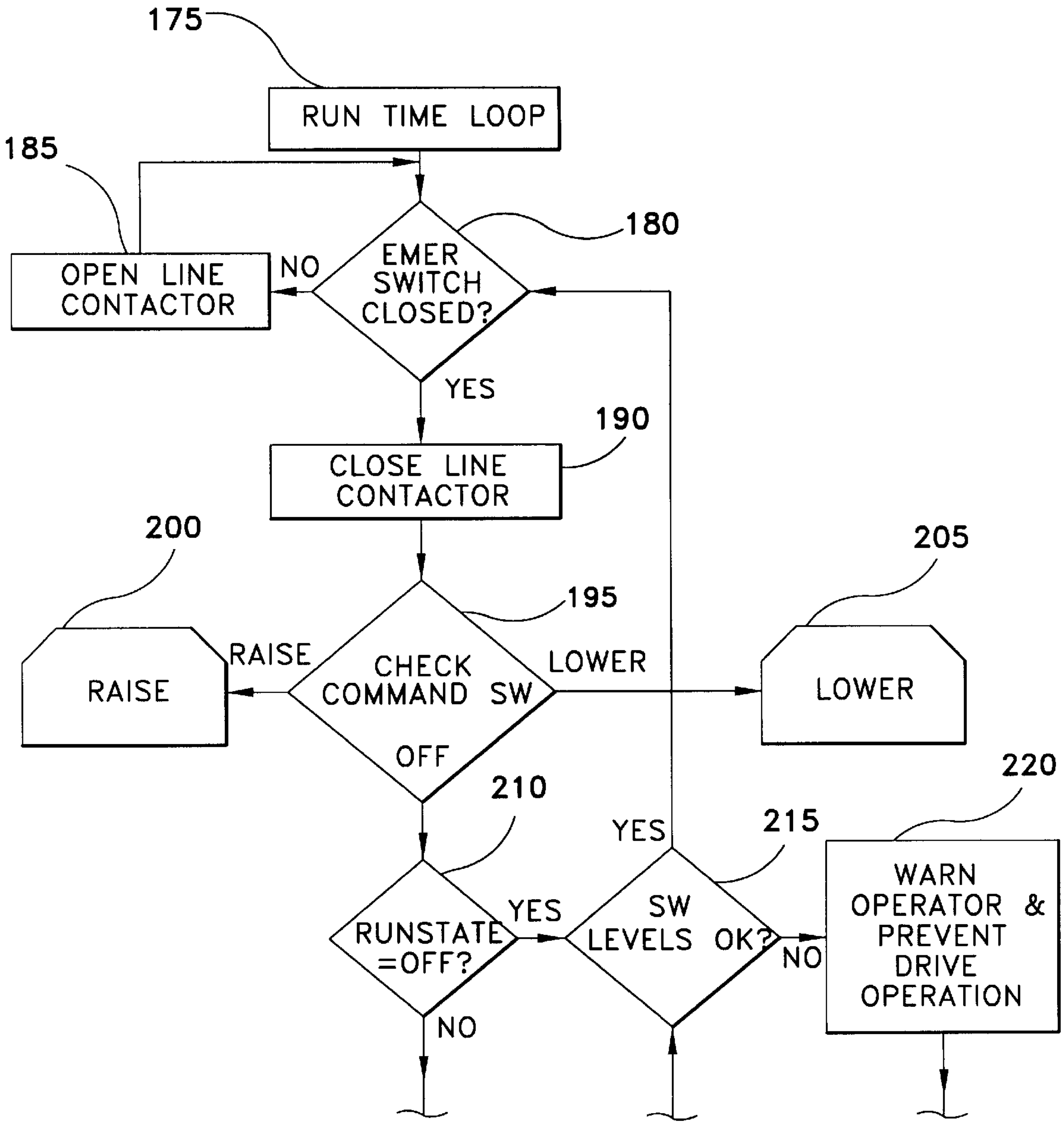
FIGS. 4A–4B are a second flow chart of the hoist control in accordance with the invention.
Figure 4B:
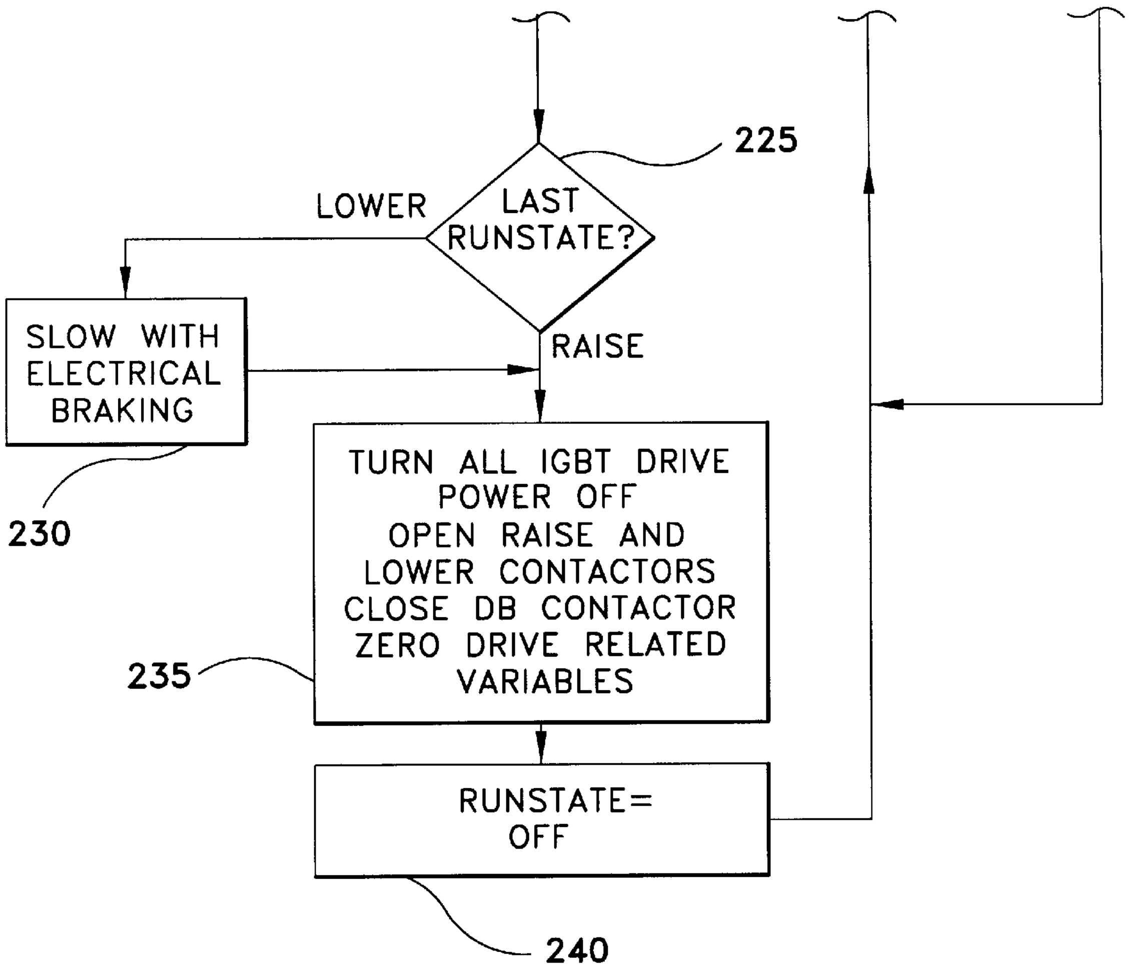
Figure 5:
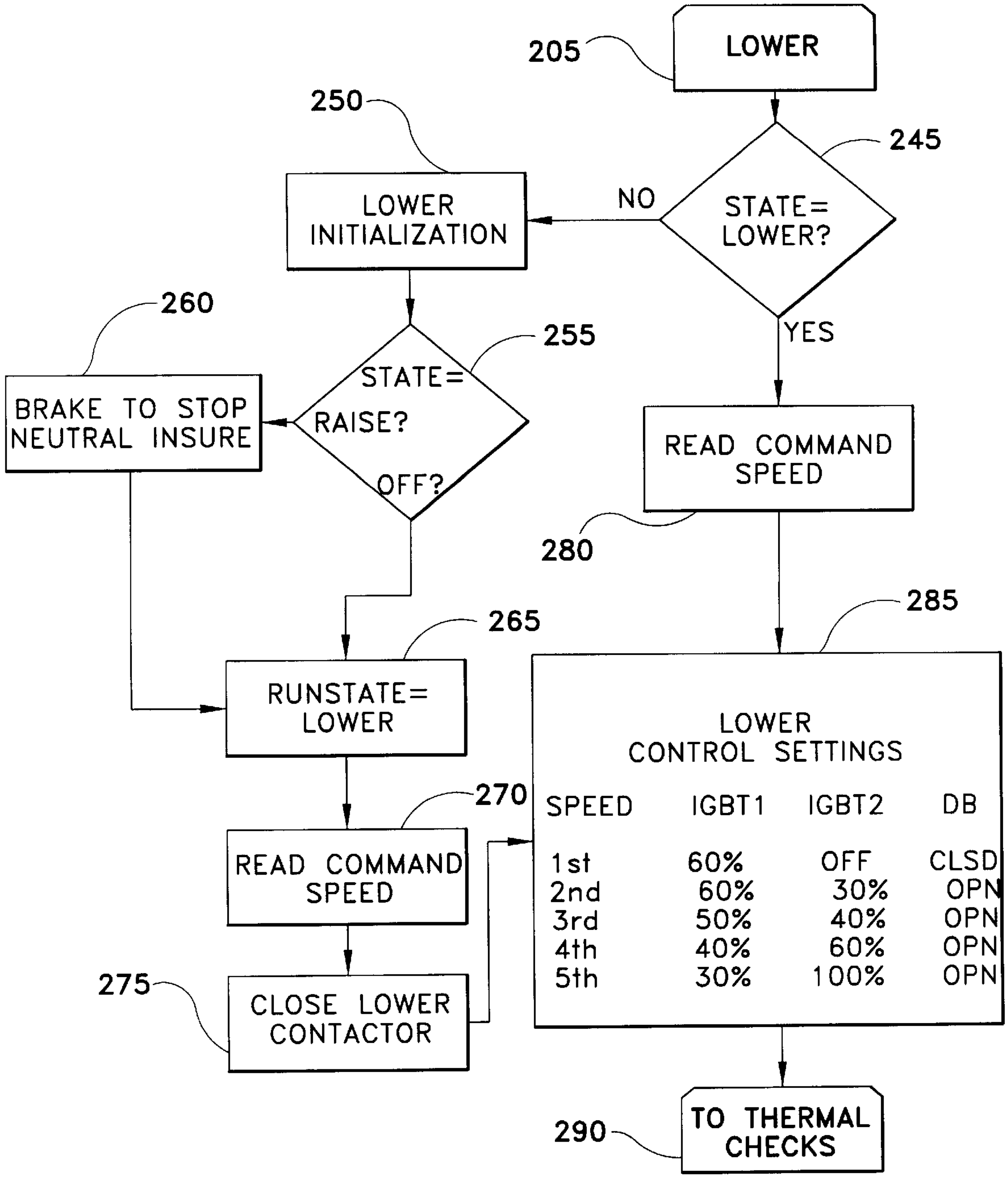
FIG. 5 is a third flow chart of the hoist control in accordance with the invention.
Figure 6:
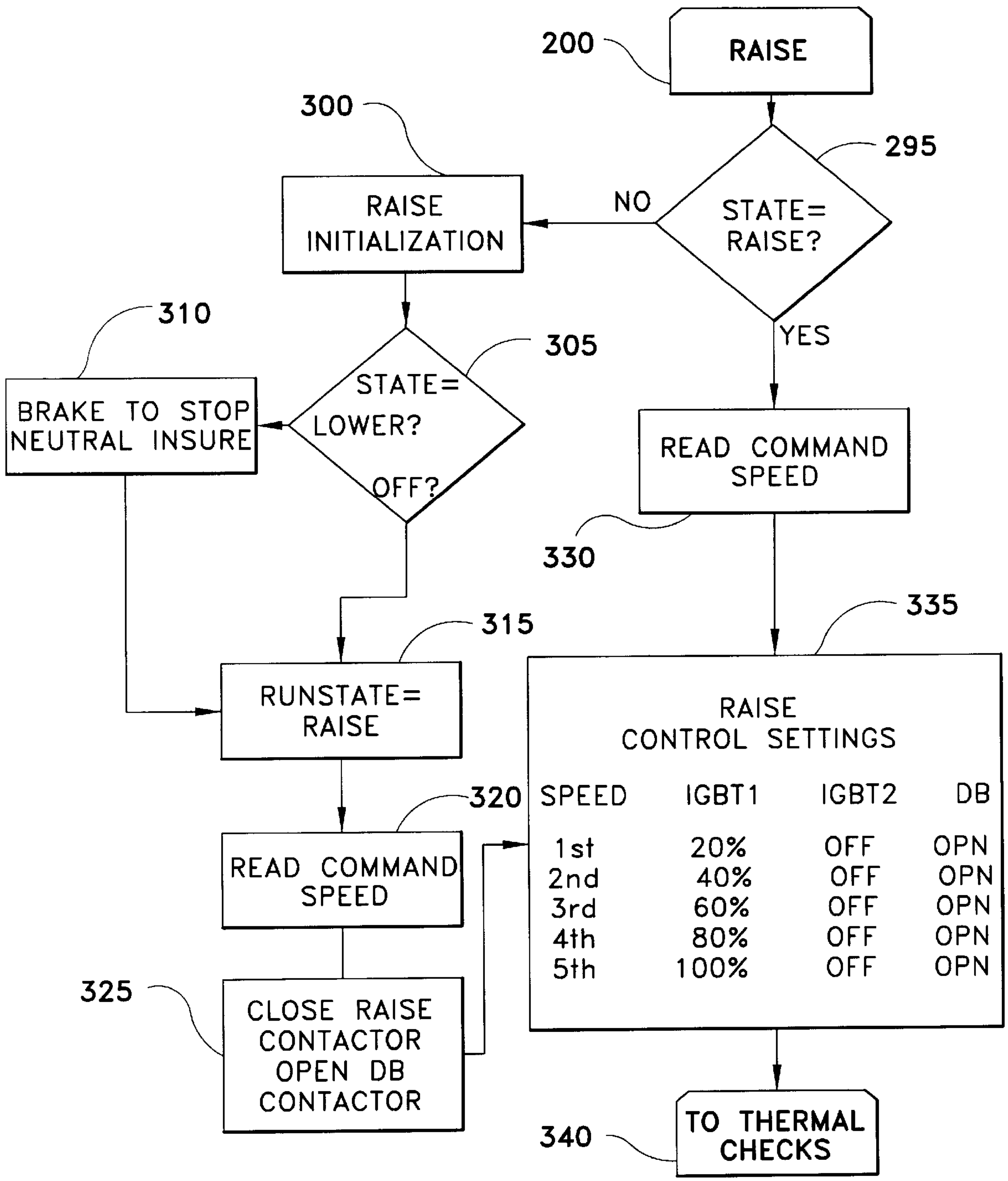
FIG. 6 is a fourth flow chart of the hoist control in accordance with the invention.
Figure 7:
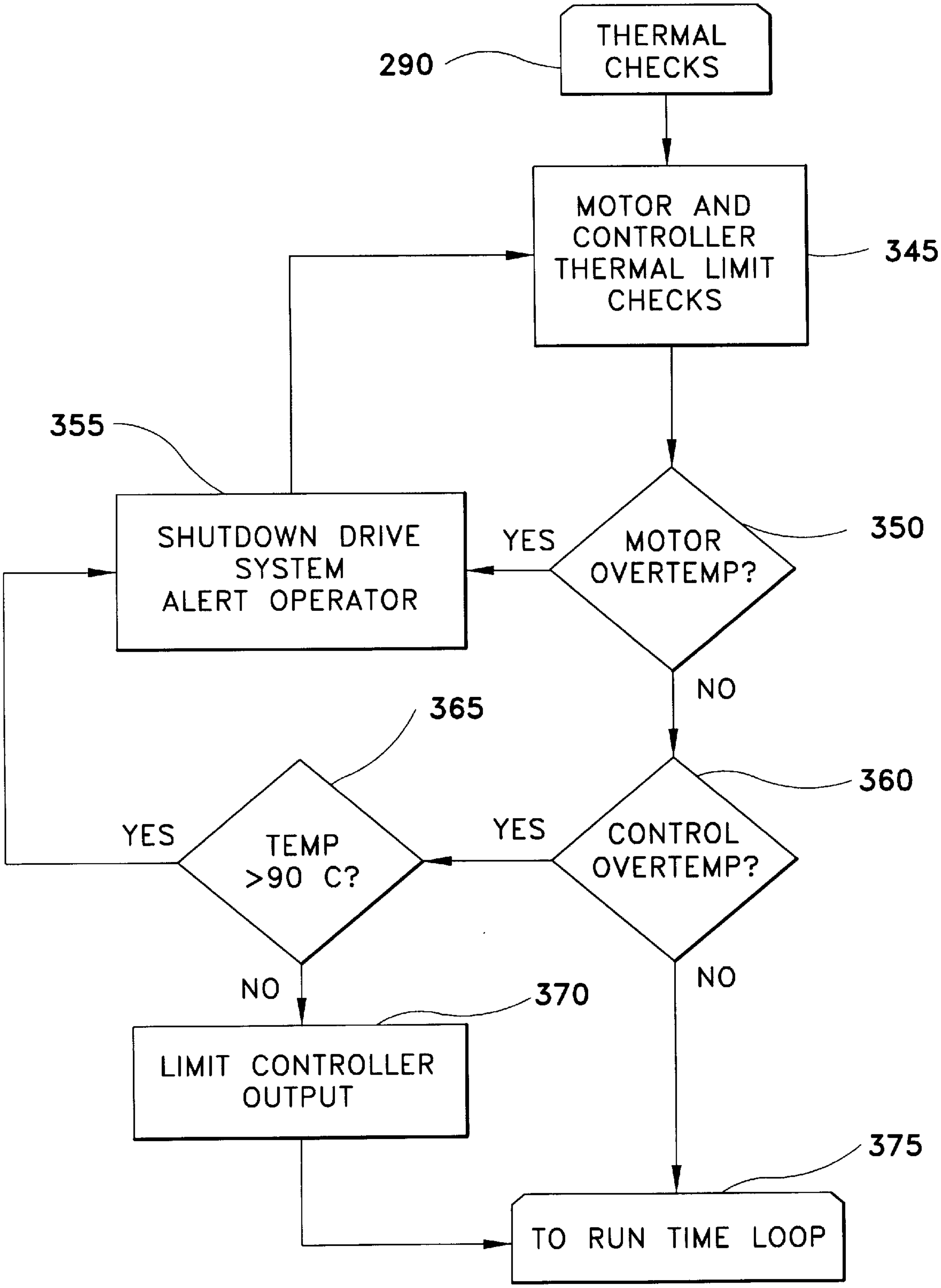
FIG. 7 is a fifth flow chart of the hoist control in accordance with the invention.

In the 'LOWER FAST' mode, as shown in FIG. 2C, the DB contactor 20 is opened, the field strength is controlled via IGBT1, and the armature voltage is controlled via IGBT2. The load is then driven down with the motor in a separately excited configuration. To increase speed the field current is reduced and the armature 10A voltage increased. The ratio of field control to armature control can be designed for maximum motor efficiency. Maximum speed would generally be obtained with IGBT2 full on and IGBT1 controlling the field current to a low level. Should the load overhaul for a given field strength the armature 10A will generate.

The generative circuit when IGBT1 is on includes armature 10A, field 10F, IGBT1, D3, and R2. The generative circuit when IGBT1 is off includes armature 10A, R1, supply, D3, R2, and armature 10A, R1, cap bank 24, D3, R2. To speed up an overhauling load, the field strength is reduced. To slow down an overhauling load the field strength is increased. It is a feature of the invention that IGBT2 and D3 form a bidirectional device which allows transition from motor to generator and from generator to motor without any need for control logic intervention.

Should the supply power be lost with a subsequent loss of control voltages, contactors 16 and 18 will open, contactor 20 will close, and the 'LOWER WITHOUT POWER' motor configuration will be as shown in FIG. 2*d.* Should the hoist have an overhauling load at that time, and the mechanical series brakes 22 fail, the rate of descent will be limited by armature 10A generating around and providing field 10F current in the series circuit shown. A braking torque proportional to the armature 10A speed will be generated. Any residual field will always be of the correct polarity to cause generation because in all control modes the field orientation is constant.

Figure 8:
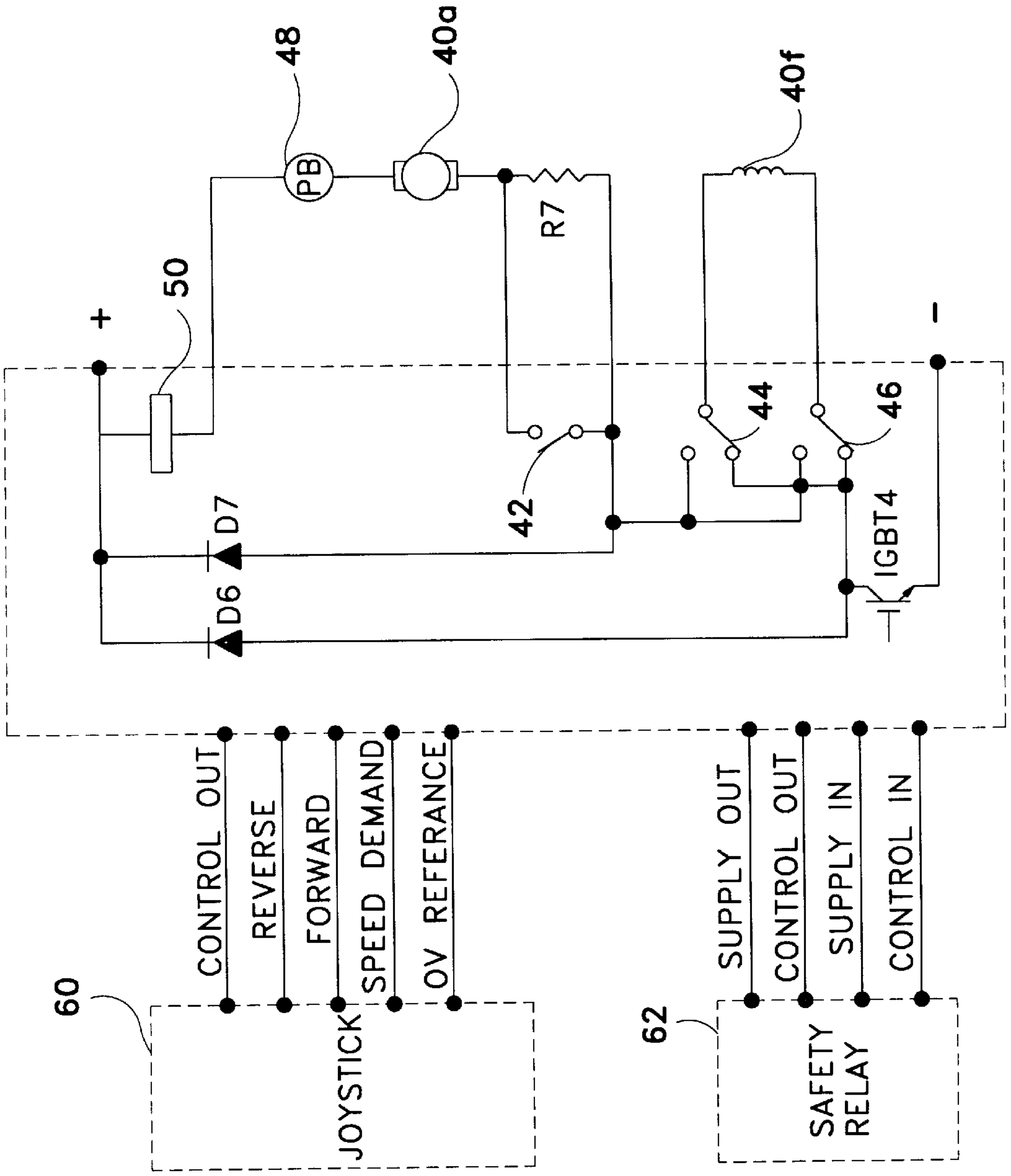
FIG. 8 is an electrical schematic diagram of travel motor circuitry in accordance with the invention.

Circuitry for a DC solid state series wound motor for a crane is illustrated in FIG. 8. Crane operations include long and cross travels. A DC chopper control provides the variable speed, programmable acceleration and deceleration ramps, controlled resistive braking, current limit, temperature protection, etc. A DC series wound motor comprising an armature 40*a* and a series wound field 40*f* is supplied with DC voltage power from an external source to the indicated supply lines. Power is delivered to the motor through contactors (not shown) similar to contactors 26, 28, and 30 shown in FIG. 1. The crane system also includes a capacitor precharge circuit (not shown) similar to capacitor bank 24 in FIG. 1. A 'FORWARD' contactor 46, a 'REVERSE' contactor 44, and a dynamic braking (DB) contactor 42 are provided for the motor. A current measuring device 50, preferably a Hall effect device, is included. Conventional shunt or series parking brakes (not shown) can be employed. Braking diode D7 is included. Of prime importance to the invention is the inclusion of high speed switching element IGBT4. Switch IGBT4 includes flywheel diode D6.

The operation of the crane DC motor will now be described. Operation is initiated in a manner similar to that described for the hoist DC motor. Contactors are closed and the capacitor bank charges at a controlled rate via the charge up resistor across the line contactor. The diode in series with a resistor connected in parallel to the line contactor provides reverse polarity protection to the system. The microprocessor logic becomes operational, performs system safety checks, and then closes the line contactor when the emergency switch is closed and the charge on the capacitor bank has reached an acceptable level. The 'FORWARD' contactor 46 and 'REVERSE' contactor 44 are open, the DB contactor 42 is open, and IGBT4 is gated off.

In general, the operator will demand 'DRIVE FORWARD' at a certain speed. The system will check for inputs from devices such as limit switches, then close the 'FORWARD' contactor 46, pulse IGBT4 and detect that the motor is not generating, close the braking contactor 42 and advance the pulse width modulation of IGBT4 to provide the appropriate average voltage across the motor to correspond to the speed demand. The current flow during drive when IGBT4 is on is the supply, the armature 40*a,* the field 40*f,* and IGBT4. When IGBT4 is off, power that was stored in the motor inductance causes a current to flow in the armature 40*a* and diode D6 series circuit. The advance of the pulse rate will be at a programmed rate. The program can be optimized to minimize hook swing, and may be modified by current limits, etc. The speed may be influenced by the size of the load. Exact speeds can be accomplished by utilizing speed measuring devices, the outputs of which are fed into the microprocessor. Should the operator demand a faster speed the pulse width modulation would be increased. Maximum speed is reached when IGBT4 is full on.

Should the operator wish to slow the crane, 'BRAKE' would be demanded. The braking effort is usually proportional to the operator demand. The system would reverse the direction contactors 44 and 46, open the braking contactor 42 to put the resistor R7 in series with the armature 40*a* and control the braking rate by modulating IGBT4. The current controlled by IGBT4 sets the field strength and therefore the greater pulse width the greater the braking torque. The braking current generated by the armature 40*a* is proportional to the field excitation and the rotational speed of the armature 40*a*. The braking current flows through armature 40*a,* resistor R7, and diode D7. As the motor rotational speed reduces the field strength can be increased to maintain the braking torque by increasing the pulse rate of IGBT4.

When the direction contactors 44 and 46 are opened and closed the logic will first shut off IGBT4. With no current flowing in the contactors, the logic will switch the contactor into its new position, then turn IGBT4 back on. This ensures the contacts do not make or brake current and have a very extended life.

The DC solid state series wound motor drives for hoist and crane applications described above provide major improvements over conventional motor drives. Maintenance time is drastically reduced. Maintenance material costs are virtually eliminated. Preventative maintenance is reduced to approximately four hours per drive per year. Wear and tear on the DC motors are substantially reduced. Currents from the DC power supply are halved. Currents on the collector bars are halved. The average current in the motor during starting conditions is up to seven times higher than the average current drawn from the supply. Considerable electrical power is saved. Microsecond shut down on fault conditions saves damage. Three times full load torque is available at 10% speed. Smooth, stepless operation is provided. Control functions are programmable from a hand terminal.

It is to be understood that the present invention is not limited to the sole embodiment described above, but encompasses any and all embodiments within the scope of the following claims.

We claim:

1. A hoist DC solid state series wound motor drive for producing high torque at low speed comprising:

a direct current motor means for maintaining field flux in the same direction at all times so that generation can occur if all power is disconnected from the motor drive;

an external direct current voltage power supply;

at least one line contactor;

at least two directional contactors;

at least one dynamic braking contactor;

at least one high speed insulated gate bipolar transistor with a parallel diode that allows automatic transition from drive to regenerative braking as a load overhauls;

microprocessor means for accessing embedded logic to control the speed, direction, acceleration and deceleration of said motor means, and for controlling said motor means as a series wound motor when raising a load and as a separately excited motor when lowering a load.

2. A DC solid state series wound motor drive according to claim 1 further comprising a charge up resistor connected in series with a diode, wherein said series connected charge up resistor and said diode are connected in parallel with said line contactor.

3. A DC solid state series wound motor drive according to claim 1 further comprising at least one current measuring device.

4. A DC solid state series wound motor drive according to claim 1 further comprising at least three power resistors.

5. A DC solid state series wound motor drive according to claim 1 further comprising a capacitor precharge circuit.

6. A DC solid state series wound motor drive according to claim 1 further comprising at least two flywheel diodes.

* * * * *